US008215114B2

(12) United States Patent
Smith et al.

(10) Patent No.: US 8,215,114 B2
(45) Date of Patent: Jul. 10, 2012

(54) EXPANDER LUBRICATION IN VAPOUR POWER SYSTEMS

(75) Inventors: Ian Kenneth Smith, London (GB); Nikola Rudi Stosic, London (GB); Ahmed Kovacevic, London (GB)

(73) Assignee: City University, London (GB)

( * ) Notice: Subject to any disclaimer, the term of this patent is extended or adjusted under 35 U.S.C. 154(b) by 658 days.

(21) Appl. No.: 11/921,836

(22) PCT Filed: Jun. 9, 2006

(86) PCT No.: PCT/GB2006/002148

§ 371 (c)(1), (2), (4) Date: Mar. 24, 2009

(87) PCT Pub. No.: WO2006/131759

PCT Pub. Date: Dec. 14, 2006

(65) Prior Publication Data

US 2009/0188253 A1 Jul. 30, 2009

(30) Foreign Application Priority Data

Jun. 10, 2005 (GB) .................................. 0511864.1
Dec. 23, 2005 (GB) .................................. 0526413.0

(51) Int. Cl.

| | |
|---|---|
| ***B01D 19/00*** | (2006.01) |
| ***F01B 31/00*** | (2006.01) |
| ***F01K 19/00*** | (2006.01) |
| ***F01K 25/08*** | (2006.01) |
| ***F01K 25/00*** | (2006.01) |

(52) U.S. Cl. ................. 60/657; 60/651; 60/670; 60/671

(58) Field of Classification Search .................... 60/646, 60/649, 651, 657, 671

See application file for complete search history.

(56) References Cited

U.S. PATENT DOCUMENTS 3,062,553 A * 11/1962 Juzi .............................. 277/304

(Continued)

FOREIGN PATENT DOCUMENTS

DE 1551274 4/1970

(Continued)

OTHER PUBLICATIONS

Great Britain Search Report issued in GB 0511864.1 dated Sep. 8, 2005.

(Continued)

*Primary Examiner* — Thomas Denion
*Assistant Examiner* — Christopher Jetton
(74) *Attorney, Agent, or Firm* — Flynn, Thiel, Boutell & Tanis, P.C.

(57) ABSTRACT

A vapor power generating system for generating power by using heat from a source of heat. The system has a closed circuit for a working fluid, and includes a heat exchanger assembly (1) for heating the fluid under pressure with heat from the source, a separator (8) for separating the vapor phase of the heated fluid from the liquid phase thereof, an expander (14) for expanding the vapor to generate power, a condenser (17) for condensing the outlet fluid from the expander (14), a feed pump (F) for returning condensed fluid from the condenser (17) to the heater and a return path for returning the liquid phase from the separator to the heater. The liquid phase of the working fluid contains a lubricant which lubricant is soluble or miscible in the liquid phase and a bearing supply path (21) is arranged to deliver liquid phase pressurized by the feed pump (F) to at least one bearing for a rotary element of the expander.

33 Claims, 6 Drawing Sheets

U.S. PATENT DOCUMENTS

Figure 1:
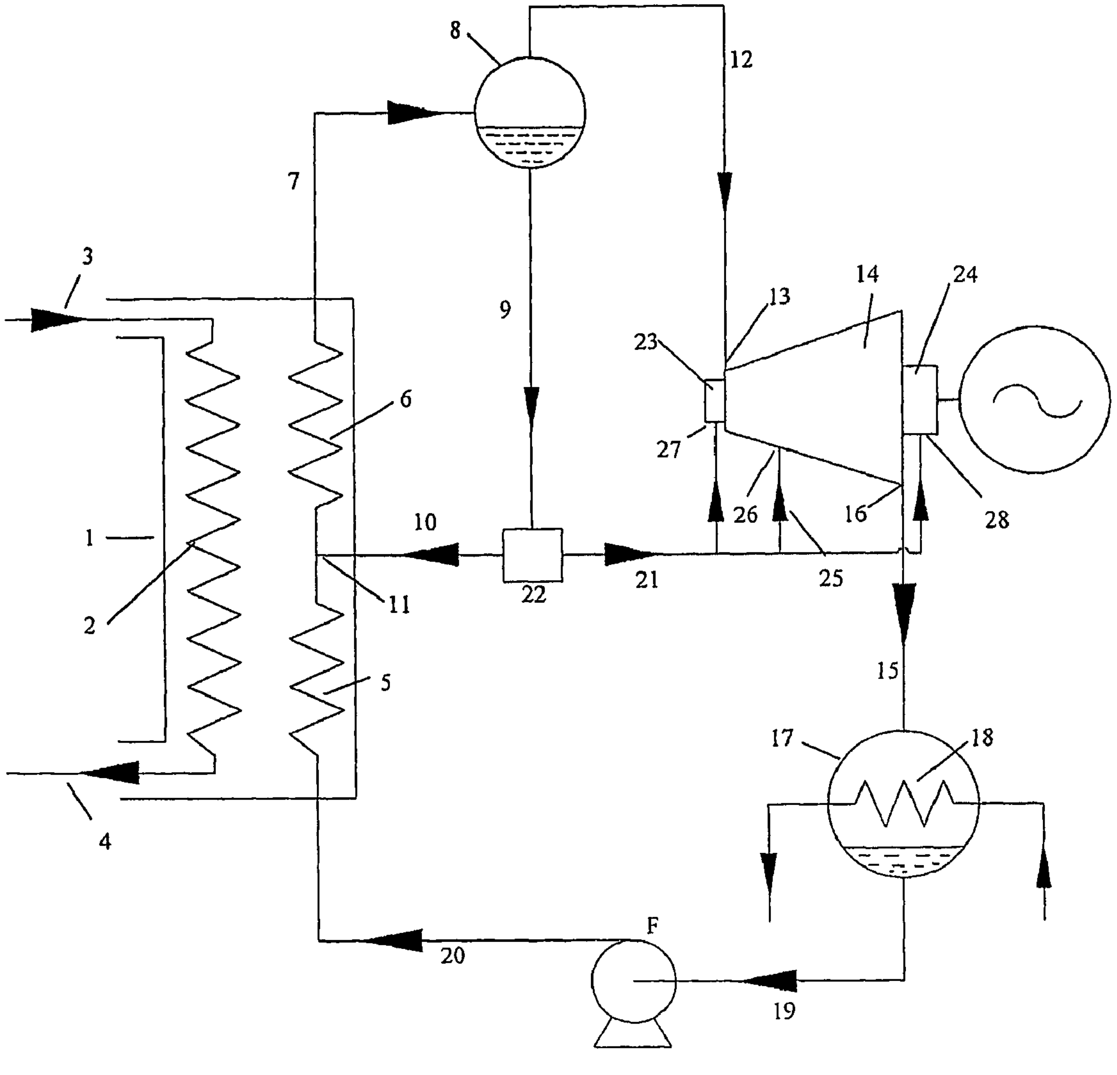

| | | | | | |
|---|---|---|---|---|---|
| 3,292,366 | A | * | 12/1966 | Rice et al. | 60/651 |
| 3,603,087 | A | * | 9/1971 | Burkland | 60/657 |
| 3,636,706 | A | * | 1/1972 | Minto | 60/651 |
| 3,797,248 | A | * | 3/1974 | Witzel et al. | 60/646 |
| 3,877,232 | A | * | 4/1975 | Girardier et al. | 60/657 |
| 3,962,874 | A | * | 6/1976 | Doerner | 60/669 |
| 3,967,450 | A | * | 7/1976 | Girardier | 60/657 |
| 4,008,573 | A | * | 2/1977 | Petrillo | 60/651 |
| 4,191,021 | A | * | 3/1980 | Nakamura et al. | 60/657 |
| 4,262,485 | A | * | 4/1981 | Kuroda et al. | 60/669 |
| 4,362,020 | A | | 12/1982 | Meacher et al. | |
| 4,471,621 | A | * | 9/1984 | Amir et al. | 60/657 |
| 4,738,111 | A | * | 4/1988 | Edwards | 60/671 |
| 5,329,771 | A | * | 7/1994 | Kytomaki et al. | 60/657 |
| 6,296,461 | B1 | | 10/2001 | Stosic | |
| 2004/0144093 | A1 | | 7/2004 | Hanna et al. | |
| 2007/0007771 | A1 | | 1/2007 | Biddle et al. | |
| 2011/0048009 | A1 | | 3/2011 | Smith et al. | |

FOREIGN PATENT DOCUMENTS

| | | | | |
|---|---|---|---|---|
| EP | 0 664 424 | A2 | | 7/1995 |
| EP | 0898655 | A1 | | 3/1999 |
| EP | 1 405 987 | A1 | | 4/2004 |
| GB | 1 084 356 | | | 9/1967 |
| GB | 2405448 | A | | 3/2005 |
| JP | 53-021342 | | | 2/1978 |
| JP | 59-041609 | A | | 7/1984 |
| JP | 05-098902 | | | 4/1993 |
| JP | 5-504607 | | | 7/1993 |
| JP | 09-088503 | | | 3/1997 |
| JP | 2004-316930 | | | 11/2004 |
| WO | WO 92/05342 | | | 4/1992 |
| WO | WO 03093649 | A1 | * | 11/2003 |
| WO | WO 2005/021936 | A2 | | 3/2005 |

OTHER PUBLICATIONS

Great Britain Search Report issued in GB 0526413.0 dated Oct. 5, 2006.

"Power Recovery From Low Cost Two-Phase Expanders", Smith et al., Trans GRC, 2001 (pp. 601-605).

"Screw Expanders Increase Output and Decrease the Cost of Geothermal Binary Power Plant Systems", Smith et al., Trans GRC, 2004 (pp. 787-793).

"Ball Bearing Lubrication in Refrigeration Compressors", Jacobson, International Compressor Engineering Conference, 1996 (pp. 103-108).

"Lubrication of Screw Compressor Bearings in the Presence of Refrigerants", Jacobson, International Compressor Engineering Conference, 1994 (pp. 115-120).

"The Effect of Refrigerants on the Lubrication of Rolling Element Bearings Used in Screw Compressors", Wardle et al., International Compressor Engineering Conference, 1992 (pp. 523-531).

First Official Action of Japan Patent Office dated Dec. 21, 2010 (5 pages) with English translation.

Second Official Action of Japan Patent Office dated May 24, 2011 (3 pages) with English translation.

International Search Report filed in PCT/GB2006/002148, dated Mar. 21, 2007 (4 pages).

* cited by examiner

EXPANDER LUBRICATION IN VAPOUR POWER SYSTEMS

This invention relates to the lubrication of expanders used in closed-circuit vapour power generating systems in which lubricant is soluble in, or miscible with, the working fluid. The invention is particularly, but not exclusively, concerned with systems for generating power from moderate or low grade heat sources such as geothermal brines, industrial waste heat sources and internal combustion engine waste heat streams where the maximum temperature for the working fluid of the system is rarely in excess of 150° C. Such systems typically use organic working fluids such as tetrafluroethane, chlorotetrafluoroethane 1.1.1.3.3—Pentafluoropropane or light hydrocarbons such as isoButane, n-Butane, isopentane, and n-Pentane and operate on the Rankine cycle or some variant of it.

According to one aspect of the invention there is provided a vapour power generating system for generating power by using heat from a source of moderate or low grade heat, comprising a closed circuit for a working fluid, the system including heating means for heating the fluid under pressure at a temperature not usually more than 200° C. with heat from the source, a separator for separating the vapour phase of the fluid from the liquid phase thereof, an expander for expanding the vapour to generate power, a condenser for condensing the outlet fluid from the expander, feed pump means for returning condensed fluid from the condenser to the heater and a return path for returning liquid phase from the separator to the heater, wherein the liquid phase contains a lubricant for the bearing which lubricant is soluble or miscible in the liquid phase and a bearing supply path is arranged to deliver liquid phase pressurised by the feed pump means to at least one bearing for a rotary element of the expander. The condenser may also initially desuperheat the vapour from the expander.

With this system the lubricant is dissolved or emulsified with the liquid phase of the working fluid and a proportion of the liquid phase leaving the separator is fed along the bearing supply path to the bearing where heat generated in the bearing evaporates the working fluid, leaving sufficiently concentrated lubricant in the bearing to provide adequate lubrication of the bearing. Preferably, collection spaces are provided around and below the bearing. Lubricant leaving the bearing and entering the expander travels to the condenser with the working fluid exhaust from the expander. The lubricant again mixes with, or dissolves in, the liquid phase formed in the condenser and returns, via the feed pump, to the heater. Build-up or deposit of lubricant in the evaporator section of the heater, which would reduce its efficiency, is prevented by its retention in the liquid recirculating through the evaporator section and partially drawn off to flow through the expander, condenser and feed pump. Advantageously, each bearing supporting the rotary element or elements of the expander is lubricated in this manner. The total mass of lubricant required is not more than 5% of the mass of working fluid. Typically 0.5% to 2% is sufficient.

The expander may be a rotary expander. The expander may for example be a turbine of the radial-inflow or axial flow type. Particularly where power outputs up to about 3MW are required, the expander may be of the twin-screw type. Where the twin-screw type expander is of the lubricated rotor type, the lubricant will be an appropriate oil and some of the mixture of oil and liquid from the separator will be fed into the expander, typically through the normal lubrication port provided for lubricated rotor twin-screw machines or a similar port nearer the high pressure port.

According to another aspect of the invention there is provided a vapour power generating system for generating power by using heat from a source of heat, comprising a closed circuit for a working fluid, the system including heating means for heating the fluid under pressure with heat from the source to generate vapour, a plural screw expander for expanding the vapour to generate power, a condenser for condensing the outlet fluid from the expander and feed pump means for returning condensed fluid from the condenser to the heater wherein a bearing supply path is arranged to deliver liquid phase pressurised by the feed pump means to at least one bearing for a rotary element of the expander, and the liquid phase delivered to the at least one bearing contains a lubricant for the expander which lubricant is soluble or miscible in the liquid phase.

Figure 2:
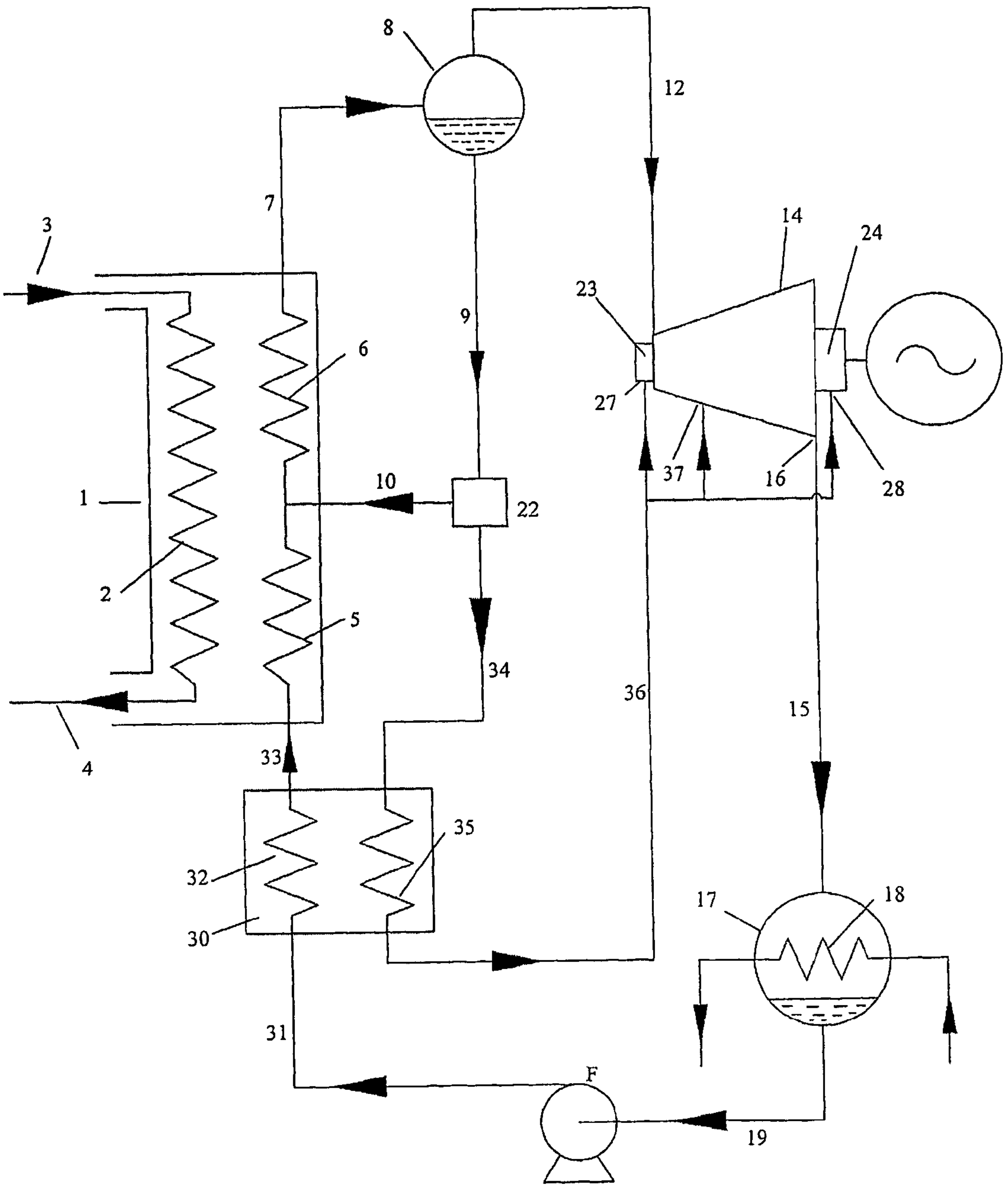
Figure 3:
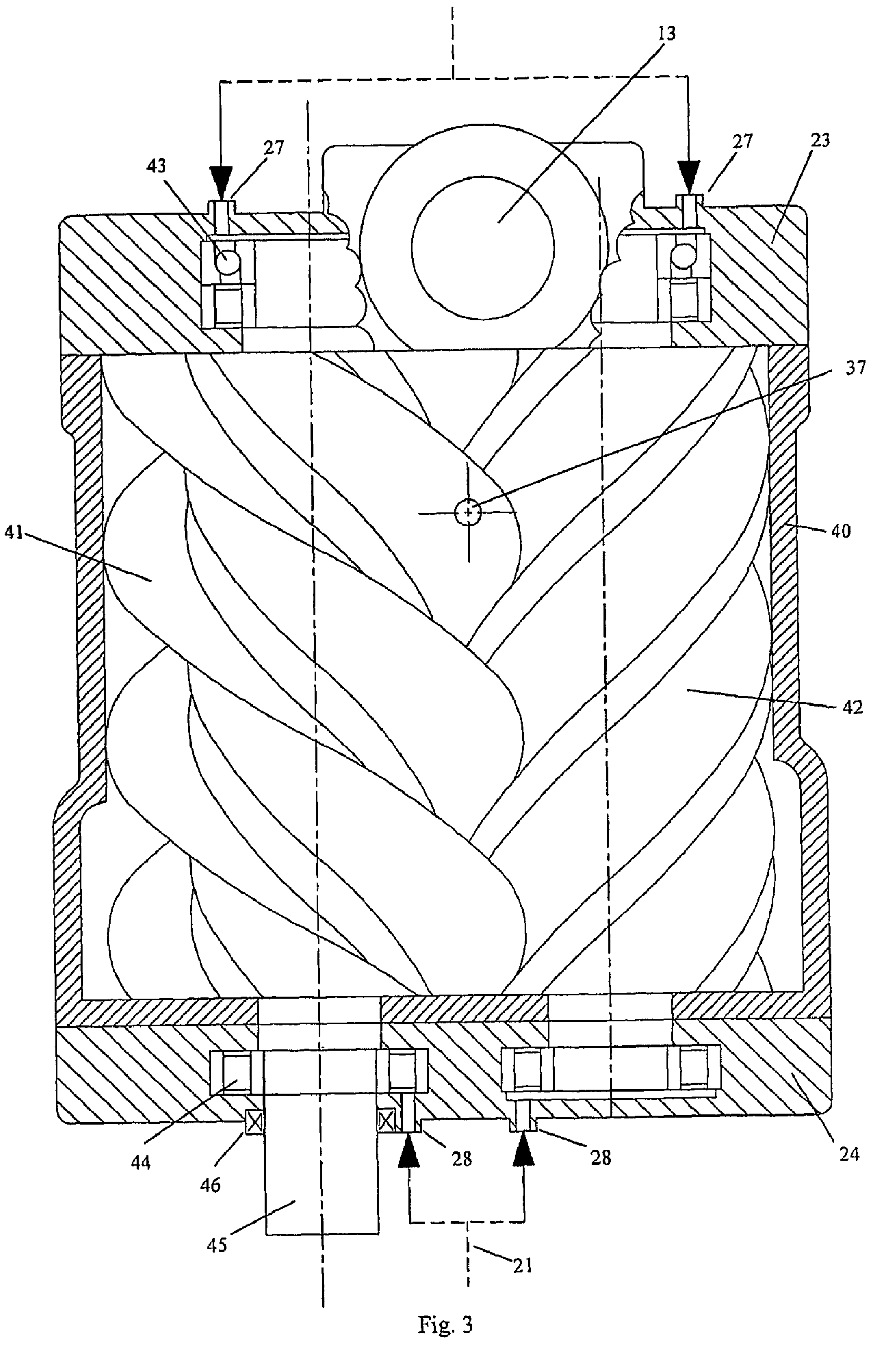
Figure 4:
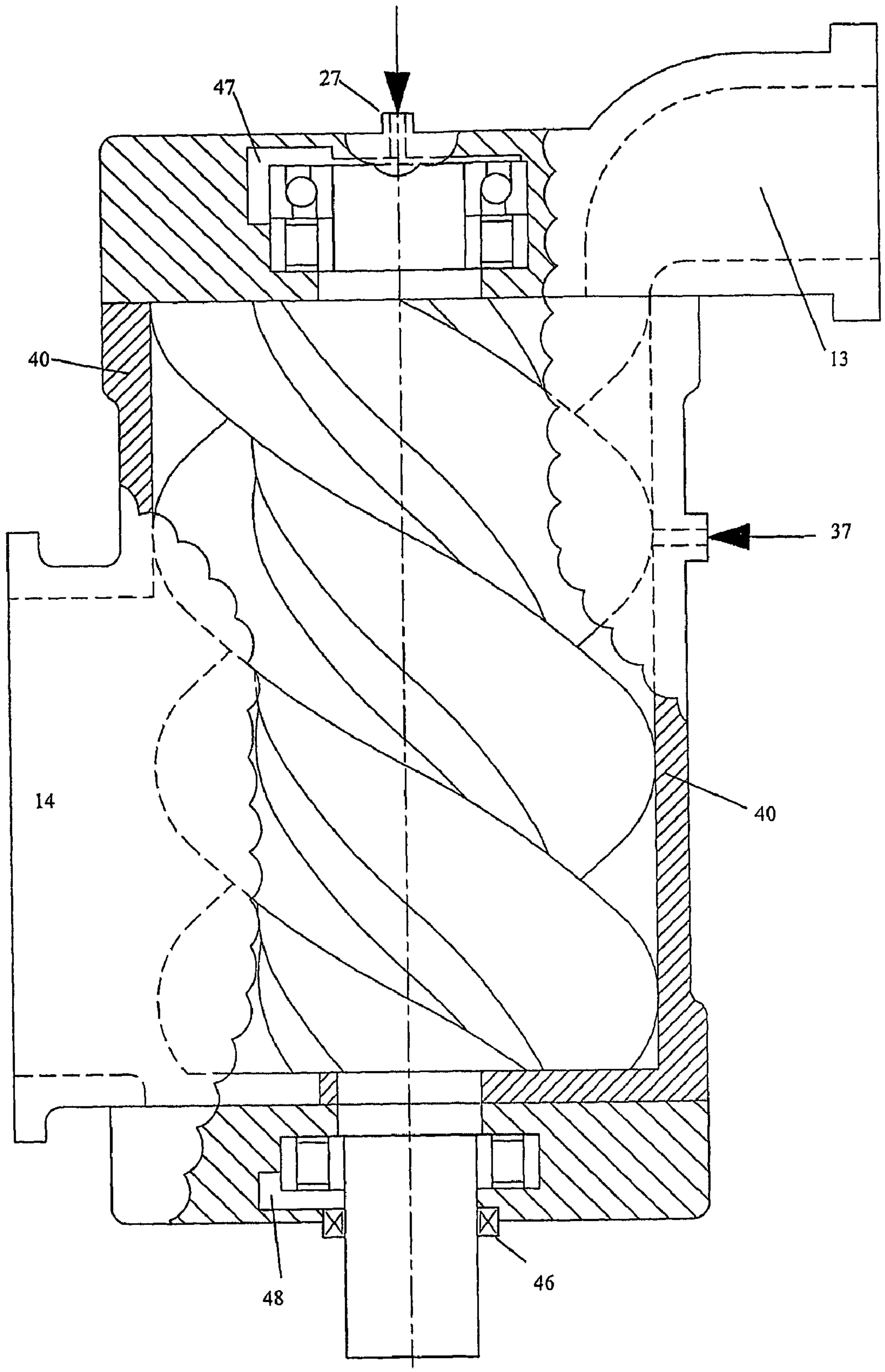
Figure 5:
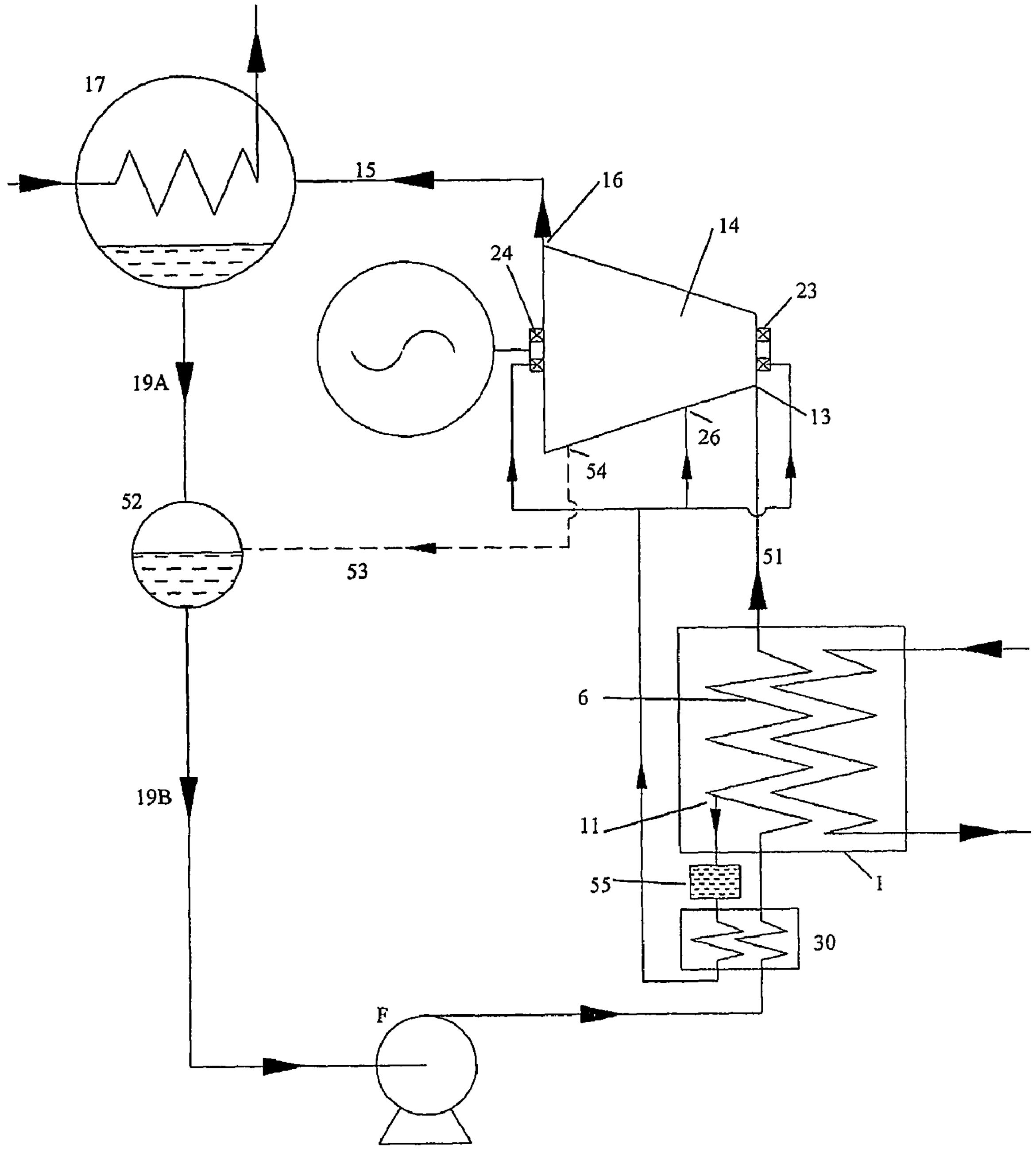
Figure 6:
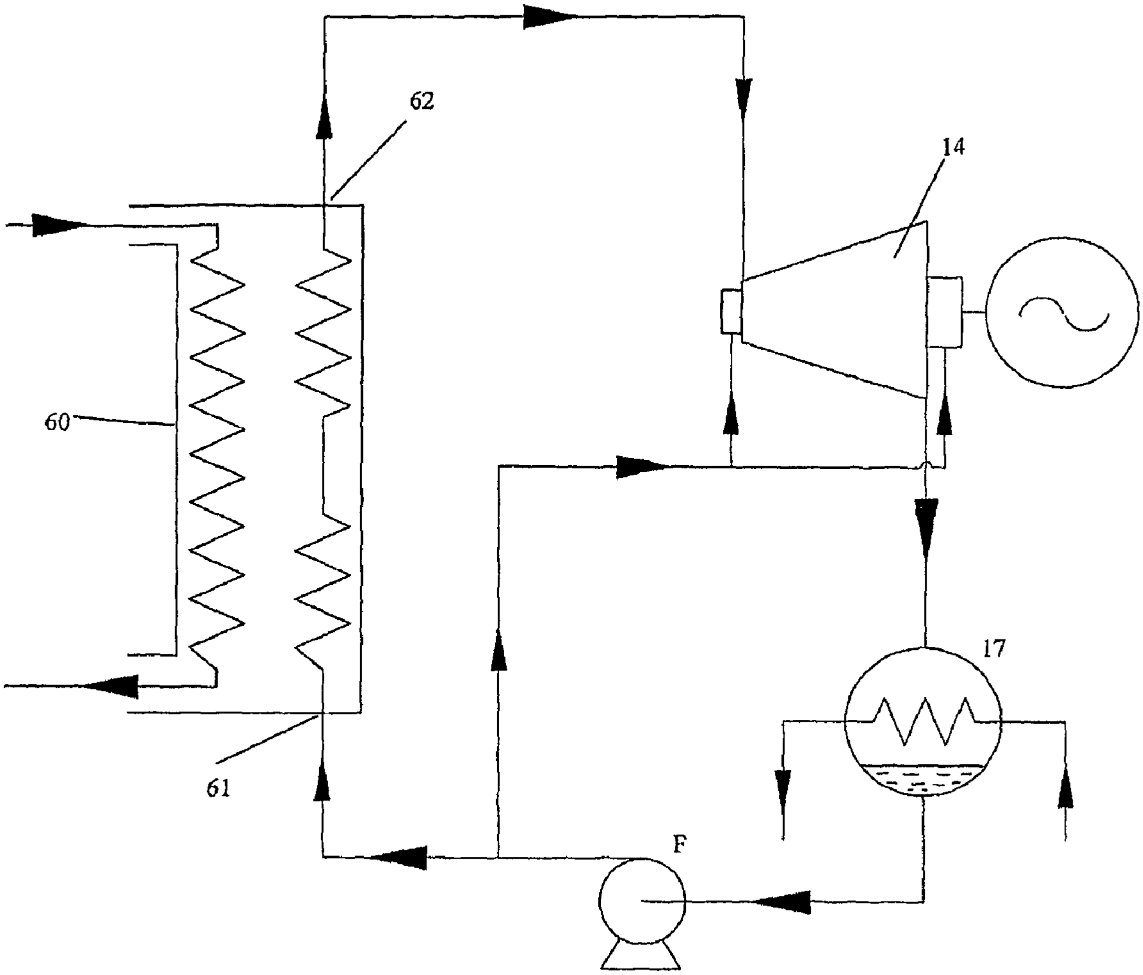

In embodiments of the invention the liquid phase may be delivered from an intermediate point of the heater, The invention will now be further described by way of example with reference to the drawings in which:

FIG. 1 is a circuit diagram of a vapour power generating system according to the invention, FIG. 2 is a circuit diagram similar to FIG. 1 but incorporating a modification, FIG. 3 is a sectional view through the rotor axes of a twin screw expander suitable for use in the circuit of FIG. 1 or 2, FIG. 4 is a longitudinal section on the line IV-IV of FIG. 3, FIG. 5 is a diagram showing the vertical disposition of components of a system similar to those shown in FIGS. 1 and 2, and FIG. 6 is a circuit diagram of an alternative embodiment of the invention using a single pass boiler.

The Organic Rankine Cycle system shown in FIG. 1 defines a closed circuit for an organic working fluid having a boiling point at atmospheric pressure below 100° C. Up to 5% (usually between 0.5 and 2%) by weight of a compatible natural or synthetic lubricating oil is added to the fluid.

The circuit comprises a heat exchanger assembly 1 for heating the working fluid in counterflow heat exchange with a hot liquid such as geothermal brine or waste from an industrial source at a temperature up to about 150° C.

The heat exchanger assembly 1 defines a path 2 for the hot fluid from the source, the path 2 extending from an inlet 3 to an outlet 4. The assembly also defines a path, extending in counterflow heat exchange with the path 2, through a heater section 5, for heating liquid working fluid, and an evaporator section 6 for evaporating at least some of the working fluid.

A line 7 leads from the outlet of the evaporator 6 to a separator 8, at a higher level than the heater section 5, for separating the vapour component of the evaporator output from the liquid component. Lines 9 and 10 serve to return the hot liquid component to the junction 11 between the heater and evaporator sections 5 and 6.

A line 12 connects the vapour output of the separator 8 to the inlet 13 of a twin-screw expander 14 for expanding the vapour to a lower pressure and thereby generating power to drive an external load such as an electrical generator G.

A line 15 leads from the exhaust outlet 16 of the expander to a condenser 17 for condensing the expanded vapour in heat exchange with a cooling fluid flowing through a circuit 18.

A line 19 connects the liquid outlet of the condenser to a feed pump F for returning the liquid to the heater under pressure through a line 20. To lubricate and cool the bearings of the expander 14, a line 21 leads from the junction 22 of the lines 9 and 10 to inlets 27, 28 in bearing housings 23, 24 containing bearings for the rotating elements of the expander.

The bearing housings 23, 24 provide sufficient space around the bearings for the oil content of the liquid working fluid to be concentrated as the working liquid evaporates into the expander as a result of heat generated in the bearings. Since much of the working fluid leaves the separator 8 as vapour, and thus free of this oil, the oil content in the lines 9, 10 and 21 will already be increased. As oil leaves the bearings and flows into the expander, it is constantly replaced by further oil from the line 21. The oil leaves the expander outlet 16 with the vapour and dissolves into the liquid condensed in the condenser 17.

Since the separator 8 is higher than the heater section 5 (and preferably higher than the evaporator 6), and since the column of liquid in the line 9 is denser than the column of fluid in the evaporator 6 and line 7, there will be continuous circulation through the evaporator section.

Similarly, the feed pump F ensures continuous circulation through the heater section 5. By tapping off the flow from the junction 22 to the bearings, a continuous circulation occurs through the heater section, bearings, condenser and feed pump so that an accumulation of oil on the surfaces of the heater and evaporator sections, which would lower their efficiencies, is prevented.

Where the expander is of the lubricated-rotor type, the line 21 may also be connected, by a line 25, to the normal oil-supply port 26 of the expander.

The circuit shown in FIG. 2 differs from that shown in FIG. 1 in that the lubricant-containing liquid tapped off from the junction 11 is cooled, for example from 80° C. to 35° C., in a heat exchanger 30, in counterflow with the liquid delivered by the feed pump F to the inlet of the heater section 5. Thus, the outlet of the feed pump F is connected by a line 31 to the inlet of a pre-heater section 32 of the heat exchanger 30. The outlet of the pre-heater section 32 is connected by a line 33 to the inlet of the main heater section 5.

Instead of feeding the lubricating flow directly from the junction 22 to the bearings, this flow is taken by a line 34 to the inlet of a cooler section 35 of the heat exchanger to flow therethrough in cooling heat exchange with the liquid in the pre-heater section 32 before being fed by a line 36 to the expander bearings 23, 24. Where the expander is a twin-screw expander, the lubricating flow may also be taken to the rotor surface lubrication inlet 37.

By cooling the lubrication flow, for example from 90° C. to 35° C., the risk of the working liquid flashing into vapour, and thus interrupting the supply of lubricant, is avoided. Further, the flow can be controlled by means of restrictors or control valves, again without vaporisation. By this means also heat that would otherwise be wasted in the bearings is recovered and used to increase the power output of the expander. The flow rate delivered to the inlet 37 depends on the working fluid and the operating conditions of the cycle but typically is of the order of two to four times the total flow delivered to the rotor bearings.

FIGS. 3 and 4 show a twin-screw expander suitable for use in the circuits of FIGS. 1 and 2. The expander has a housing 40 containing a helically lobed rotor 41 meshing with a helically grooved rotor 42. The rotor profiles, as seen in cross section are of the low friction type having helical involute bands in the region of their pitch circles, being preferably of the type disclosed in EP 0,898,655. The rotors 41 and 42 are supported in rolling bearings 43, 44 in the bearing housings 23, 24. The rotor 41 has an extension 45 projecting through the bearing housing 24, with a sealing assembly 46, to drive the external load such as the generator G.

The housing is formed with the rotor surface lubrication inlet 37 in a position just downstream of the vapour inlet 13 to ensure a sufficient pressure drop to provide an adequate lubrication flow.

The working liquid portion of this flow forms the major part of this flow and is free to vaporise and provide work as it flows through the expander while depositing lubricant on the rotor surfaces. The resulting surplus lubricant is carried by the flow of vapour leaving the expander to the condenser and is thus recirculated.

It may be found advantageous to provide collecting spaces (47, 48) adjacent to the rotor bearings.

Where the source of heat is formed by the exhaust gases and cooling jacket of an internal combustion engine, chlorotetrafluoroethane is a particularly suitable working fluid.

As shown in FIG. 5, the condenser 17 is positioned at the highest point in the system and the heater 1 and feed pump are positioned low down. Since the expander 14 is of the positive displacement type (e.g. twin screw expander) which can tolerate the possible presence of liquid droplets in the vapour flow, the separator 8 and liquid return line 9 can be omitted. Instead, the vapour from the evaporator section 6 is supplied by a line 51 to the inlet 13 of the expander 14.

The expander inlet 13 is at the bottom at one end and the low pressure vapour outlet 16 is at the top of the expander (in contrast to the orientation shown in FIG. 4). Although excess oil will tend to be expelled with the vapour into the line 15, residual oil may remain in the expander 14. This will ensure adequate lubrication of the rotor surfaces under all working conditions, and also improve the sealing of the working fluid by filling up the leakage gaps formed by the inevitable clearances between the rotors and between the rotors and the casing with oil.

As shown, the liquid condensed in the condenser 17 is conveyed by a line 19A to a liquid receiver 52 which holds a reservoir of working liquid. Liquid from the receiver 52 is conveyed by a line 19B to the inlet of the feed pump F. The hydrostatic head between the condenser 17 and the feed pump reduces or avoids the risk of cavitation in the inlet to the feed pump.

If it is found that the build of up oil in the expander is too great, an oil return line 53, of very small bore, connects an outlet 54 in the bottom of the casing of the expander to the return path from the condenser to the feed pump, in this case being connected to the liquid receiver 52. The outlet 54 is positioned just up stream of the main outlet 16 of the screw expander in a position where the pressure is just sufficiently higher than that in the receiver 52 to enable the excess oil to leave the expander.

The heater 1, preferably a plate-type heat exchanger and the liquid flow to the bearings of the expander may be accumulated in a storage vessel 55 before or after cooling in the heat exchanger 30 and being supplied to the bearing housings 23 and 24 and if necessary to the rotor surface lubricating inlet 26.

As shown in FIG. 6, in an alternative embodiment the working fluid is heated in a single pass boiler 60 in which cold liquid enters at the inlet 61 and slightly wet vapour leaves at the exit 62, without internal recirculation through a separator. In this case, the lubricant e.g. oil contained in the working fluid cannot accumulate in the boiler but is transported by the vapour to enter the expander 14. However, the presence of oil in the working fluid has the effect of raising the saturation temperature of the vapour for a given pressure and this effect can be used to advantage in this embodiment.

At oil concentrations of 5% or less, by mass, this temperature displacement is, in most cases, negligible and the working fluid thermodynamic properties are virtually identical with those of the pure working fluid. In the case of a boiler in which the working fluid recirculates through the evaporator, the recirculation flow rate is normally at least 5 times the bulk flow of fluid through the boiler. Thus, if the oil concentration is initially, say 2% by mass, the increase in concentration of oil as a result of evaporation of about 20% of the fluid, has a negligible effect on the fluid behaviour.

However, in a single pass boiler, with the same initial concentration of oil, the presence of oil has an increasing effect on the fluid behaviour as evaporation proceeds. Thus, initially, as evaporation proceeds, the working fluid behaves as a pure fluid. However, when 80-90% of the evaporation is complete, the oil concentration in the remaining liquid will become significant and further heat transfer to it, from the external heat source to the boiler, will result in the remaining liquid becoming superheated while retaining most of the oil. This means that the working fluid will enter the expander 14, as a wet vapour, with some 5-10% liquid containing a high percentage of oil. In a screw or any other type of positive displacement expander, the presence of liquid can be beneficial since i) It may help to seal the gaps and lubricate the machine.

ii) It evaporates during the expansion process and thereby decreases the superheat with which organic working fluids normally leave the expander 14.

Thus, the superheated liquid effectively carries the oil to the rotating parts of the expander and leaves an oil deposit there as expansion proceeds in exactly the same manner as it would, if drawn from the recirculated liquid of a conventional boiler.

The oil build up in the expander will eventually drain or be transported into the condenser 17 where it will be redissolved or entrained. Thus, the cold working fluid leaving the feed pump will contain oil. Cold liquid can therefore be drawn from downstream of the pump and delivered directly to the bearings without preheating and the consequent need of a regenerative heat exchanger. Thus, the use of a single pass boiler leads to further simplification to the lubrication system, as shown.

Although it is not shown in FIG. 6, the arrangement of that figure could also include a liquid receiver arrangement of the type shown in FIG. 5 to collect and hold liquid condensed in the condenser 17 and/or excess oil from the expander.

The invention claimed is:

1. A vapour power generating system for generating power by using heat from a source of heat, comprising a closed circuit with a working fluid, the system including:

a heater for heating the working fluid under pressure with heat from the source of heat;

a separator for separating a vapour phase of the working fluid heated by the heater from a liquid phase thereof;

an expander for expanding the vapour phase of the working fluid to generate power;

a condenser for condensing the working fluid discharged from the expander;

a feed pump for returning the working fluid condensed in the condenser from the condenser to the heater; and a return path for returning the liquid phase of the working fluid from the separator to the heater;

wherein the liquid phase of the working fluid contains a lubricant for at least one bearing for at least one rotary element of the expander, which lubricant is different from, and soluble or miscible in, the liquid phase of the working fluid, and a bearing supply path is arranged to deliver the liquid phase of the working fluid containing the lubricant and pressurised by the feed pump to the at least one bearing for the at least one rotary element of the expander.

2. The system according to claim 1, wherein the heater includes an evaporator, an evaporator section with the evaporator and a heater section, and the return path for returning the liquid phase of the working fluid from the separator to the heater leads to a junction between the heater and evaporator sections.

3. The system according to claim 1, wherein the bearing supply path leads from an intermediate portion of the heater.

4. The system according to claim 1, wherein collection spaces are provided in communication with the at least one bearing.

5. The system according to claim 1, wherein a heat exchanger is included in the bearing supply path for cooling the working fluid delivered to the bearing in heat exchange with liquid from the feed pump.

6. The system according to claim 1, wherein the expander is a rotary expander.

7. The system according to claim 6, wherein the bearing supply path leads to each of the at least one bearing supporting the at least one rotary element of the expander.

8. The system according to claim 6, wherein the expander is a twin-screw machine.

9. The system according to claim 8, wherein the twin-screw machine is of a lubricated-rotor type and the bearing supply path also leads to an oil supply port of the expander.

10. The system according to claim 9, wherein rotors of the twin-screw machine have portions in substantially rolling contact with each other.

11. The system according to claim 10, wherein the portions of the rotors in substantially rolling contact with each other are involute portions defined by a common straightline rack portion.

12. The system according to claim 11, wherein the portions of the rotors in substantially rolling contact with each other are located adjacent to pitch circles of rotor profiles of the rotors.

13. The system according to claim 10, wherein the portions of the rotors in substantially rolling contact with each other are located adjacent to pitch circles of rotor profiles of the rotors.

14. The system according to claim 1, including a liquid receiver in communication with the condenser and the feed pump to receive liquid condensed in the condenser.

15. The system according to claim 1, wherein the source of heat is an internal combustion engine and the working fluid is chlorotetrafluoroethane.

16. The system according to claim 1, wherein heat generated in the at least one bearing for the at least one rotary element of the expander evaporates the liquid phase of the working fluid to leave sufficient concentrated lubricant in the at least one bearing to lubricate the at least one bearing.

17. The system according to claim 1, wherein the working fluid leaves the heater as a wet vapour.

18. The system according to claim 17, wherein the heater is a single pass boiler.

19. The system according to claim 1, wherein a percentage by weight of lubricant soluble or miscible in the liquid phase of the working fluid is not more than 5% of a weight of the working fluid.

20. The system according to claim 19, wherein the percentage by weight of lubricant soluble or miscible in the liquid phase of the working fluid is 0.5 to 2% of the weight of the working fluid.

21. A vapour power generating system for generating power by using heat from a source of heat, comprising a closed circuit with a working fluid, the system including:

a heater for heating the working fluid under pressure with heat from the source of heat to generate vapour;

a plural screw expander for expanding the vapour to generate power;

a condenser for condensing fluid discharged from the expander; and a feed pump for returning condensed fluid from the condenser to the heater;

wherein a liquid phase of the working fluid contains a lubricant for at least one bearing for at least one rotary element of the expander, which lubricant is different from, and soluble or miscible in, the liquid phase of the working fluid, and a bearing supply path is arranged to deliver the liquid phase of the working fluid containing the lubricant and pressurised by the feed pump to the at least one bearing for the at least one rotary element of the expander.

22. The system according to claim 21, wherein the working fluid leaves the heater as a wet vapour.

23. The system according to claim 22, wherein the heater is a single pass boiler.

24. The system according to claim 21, wherein the plural screw expander is of a lubricated-rotor type and the bearing supply path also leads to an oil supply port of the expander.

25. The system according to claim 24, wherein rotors of the plural screw expander have portions in substantially rolling contact with each other.

26. The system according to claim 25, wherein the portions of the rotors in substantially rolling contact with each other are involute portions defined by a common straightline rack portion.

27. The system according to claim 25, wherein the portions of the rotors in substantially rolling contact with each other are located adjacent to pitch circles of rotor profiles of the rotors.

28. The system according to claim 21, including a liquid receiver in communication with the condenser and the feed pump to receive liquid condensed in the condenser.

29. The system according to claim 28, wherein the expander includes a lubricant drain in communication with the liquid receiver to receive lubricant from the expander.

30. The system according to claim 21, wherein the source of heat is an internal combustion engine and the working fluid is chlorotetrafluoroethane.

31. The system according to claim 21, wherein a percentage by weight of lubricant soluble or miscible in the liquid phase of the working fluid is not more than 5% of a weight of the working fluid.

32. The system according to claim 31, wherein the percentage by weight of lubricant soluble or miscible in the liquid phase of the working fluid is 0.5 to 2% of the weight of the working fluid.

33. A vapour power generating system for generating power by using heat from a source of heat, comprising a closed circuit with a working fluid, the system including:

a heater for heating the working fluid under pressure with heat from the source of heat;

a separator for separating a vapour phase of the working fluid heated in the heater from a liquid phase thereof;

an expander for expanding the vapour phase of the working fluid to generate power;

a condenser for condensing the working fluid discharged from the expander;

a feed pump for returning the working fluid condensed in the condenser from the condenser to the heater; and a return path for returning the liquid phase of the working fluid from the separator to the heater;

wherein the liquid phase contains a lubricant for at least one bearing for at least one rotary element of the expander, which lubricant is soluble or miscible in the liquid phase of the working fluid, and a bearing supply path is arranged to deliver the liquid phase of the working fluid pressurised by the feed pump to the at least one bearing for the at least one rotary element of the expander; and wherein the heater includes an evaporator, an evaporator section with the evaporator and a heater section, and the return path for returning the liquid phase of the working fluid from the separator to the heater leads to a junction between the heater and evaporator sections, the bearing supply path leads from an intermediate portion of the heater, collection spaces are provided in communication with the at least one bearing, a heat exchanger is included in the bearing supply path for cooling the working fluid delivered to the at least one bearing in heat exchange with the working fluid from the feed pump, and the expander is a rotary expander.

* * * * *